Oct. 3, 1967  W. T. PRUETT  3,344,662
SPECIMEN HOLDING DEVICE FOR TENSILE TEST APPARATUS
Filed Aug. 2, 1965  2 Sheets-Sheet 1

William T. Pruett,
INVENTOR.

BY Harry M. Saragovitz
Edward J. Kelly
Herbert Berl
J. Keith Fowler

Oct. 3, 1967　　　　W. T. PRUETT　　　　3,344,662
SPECIMEN HOLDING DEVICE FOR TENSILE TEST APPARATUS
Filed Aug. 2, 1965　　　　　　　　　　　　　　　2 Sheets-Sheet 2

William T. Pruett,
INVENTOR.

SPECIMEN HOLDING DEVICE FOR TENSILE TEST APPARATUS

William T. Pruett, Huntsville, Ala., assignor to the United States of America as represented by the Secretary of the Army
Filed Aug. 2, 1965, Ser. No. 476,764
4 Claims. (Cl. 73—103)

ABSTRACT OF THE DISCLOSURE

A holding device for use with tensile test apparatus and particularly adapted for clamping and holding a relatively "thin" specimen. The device includes an upper gripper assembly and a lower gripper assembly for holding the respective upper and lower ends of a specimen. Shock absorbing means is provided between each of the gripper assemblies and the respective movable members of a conventional test apparatus to which the assemblies are attached. The lower gripper assembly includes a pair of relatively movable, plate-like jaws for gripping the specimen and providing side support therefor; and this assembly further includes a cam actuator and pin loading means.

---

The invention described herein may be manufactured and used by or for the Government for governmental purposes without the payment of any royalty thereon.

This invention relates generally to an improved holding or clamping device for use in tensile test apparatus. More particularly, the invention relates to an improved holding device for securing the opposite ends of a material specimen within a tensile testing machine, wherein the specimen secured therein is tested under varying temperature, or the like, conditions to determine the yield or ultimate tensile strength and elongation thereof. The present invention is especially concerned with providing a specimen holding device which is adapted for advantageous use in holding specimen of the type which are relatively "thin" structurally.

In order to obtain accurate results in testing specimen of the latter type, a holding device is required which has positive holding action and which provides side support for the specimen after the same is loaded into the holding device. At present, many types of mechanical holding or clamping devices are utilized; however, none of these devices is fully satsifactory for testing "thin" specimen. For example, buckling of the specimen during extreme temperature tensile tests is a common problem in the use of known holding devices.

Accordingly, it is a principal object of this invention to provide a specimen holding device which during tests will prevent buckling of a specimen secured therein.

It is another object of this invention to provide a specimen holding device which is simple in construction, easy to load and operate, and convenient to use with conventional testers.

It is a further object of this invention to provide a specimen holding device which is adapted to be readily adjusted for testing specimen of varying thickness.

A novel feature of the invention resides in the provision of a specimen holding device having pin-loading and side-supporting capabilities.

Figure 1:
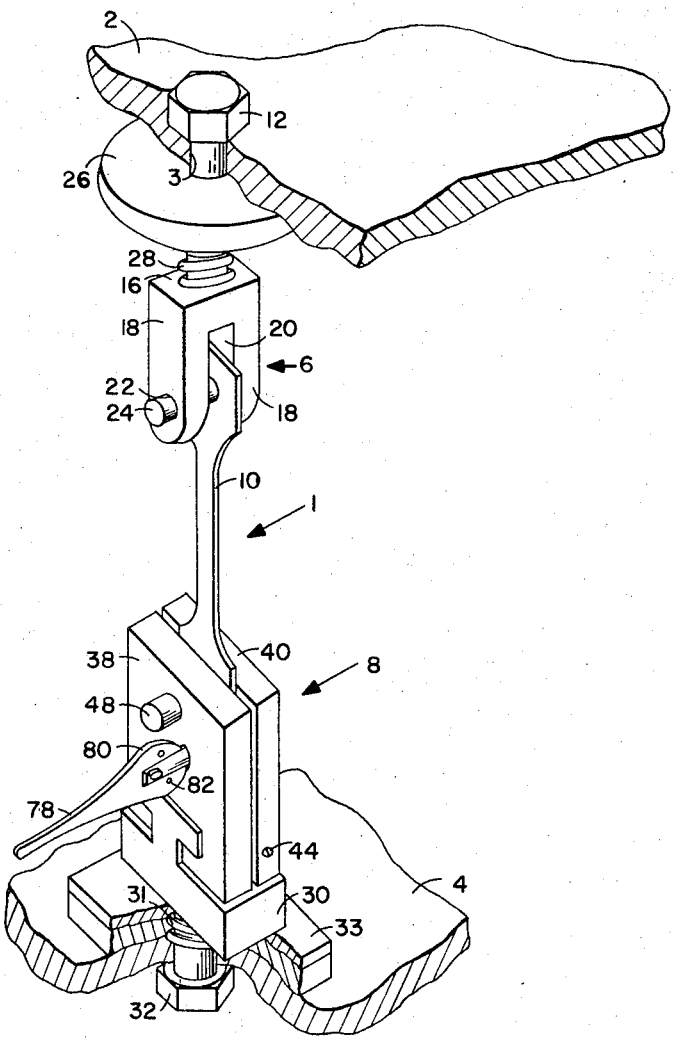
Figure 2:
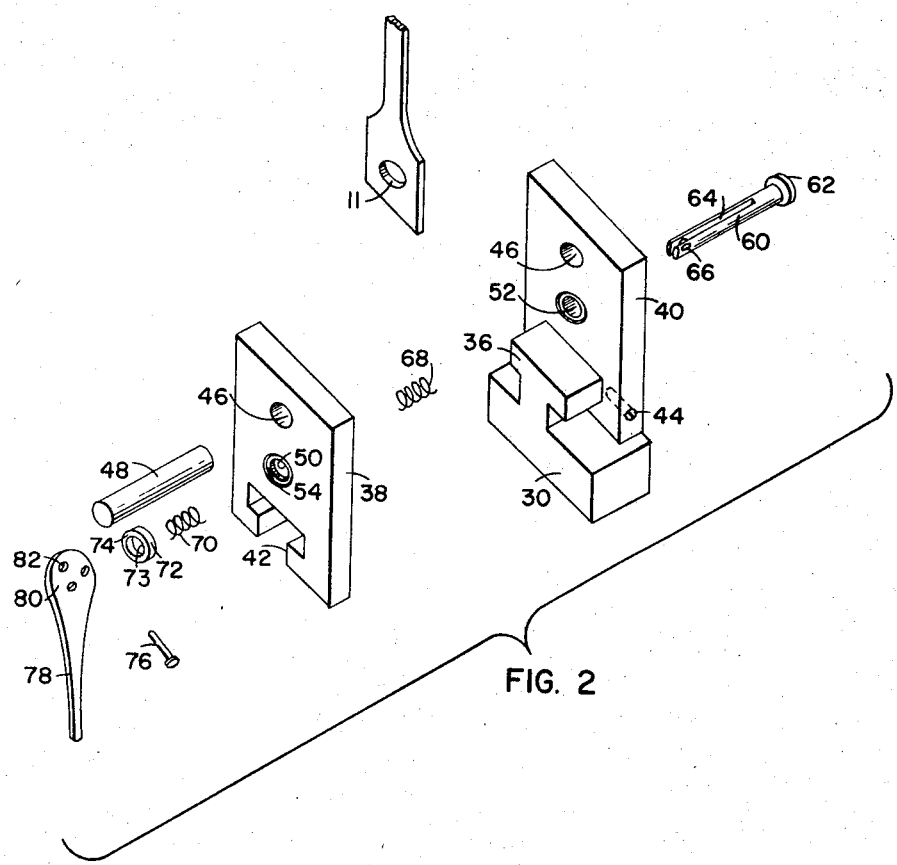

The foregoing and other objects and features of this invention will become more fully apparent from the following detailed description and from the accompanying drawings, in which:

FIGURE 1 is a perspective view of a specimen holding device with a specimen secured therein; and FIGURE 2 is an exploded perspective view illustrating the major components of the lower gripper assembly and a material specimen partially shown.

Referring to the drawing (FIGURE 1), reference numeral 1 designates a holding device secured between relatively movable members 2 and 4 (partially shown in broken-away section) of a conventional tensile testing machine (not shown). The holding device includes an upper gripper assembly 6 and a lower gripper assembly 8. FIGURE 1 illustrates a typical, elongated, relatively thin, material specimen 10 secured for tensile testing within the holding device in a manner to be described in detail hereinafter.

The upper gripper assembly includes a first mounting stud or shaft 12 threadedly secured at its lower end to a bifurcated holding means or clevis 16. Clevis 16 is defined by a pair of depending legs 18 providing an elongated slot or space 20 therebetween. Each of the legs is formed with at least one transversely extending aperture 22. These apertures are disposed in direct, transverse, coaxial alignment so as to receive an elongated pin 24 therein. The upper assembly further includes a centrally apertured mounting plate or enlarged washer 26 and compression spring 28, both of which are utilized in mounting said assembly to a conventional tester in a manner to be described hereinafter.

Lower gripper assembly 8 includes a mounting head or block 30 carried by the upper end of a second mounting stud or shaft 32. The upper end of shaft 32 is preferably threadedly secured within said block. Extending upwardly from the upper face of the block is a T-shaped key means 36. A pair of elongated, plate-like gripper jaws 38, 40, each having a T-shaped slot or keyway 42 formed in the lower end thereof, are adapted to be disposed in side-by-side relationship for sliding engagement of their lower ends on the upper face of block 30, when the respective key and keyways are in mating engagement. A setscrew 44 is provided in a side wall of gripper jaw 40, said screw being adapted to extend into abutting engagement with the head of the T-shaped key of the block so as to provide means for locking said jaw in a selected position preventing movement laterally of the upper face of the block. A transversely extending aperture 46 is provided in the upper end of each of the jaws, said apertures being disposed in coaxial alignment so as to receive an elongated pin 48 therein. Jaws 38 and 40 are provided, respectively, intermediate the ends thereof with second, transverse apertures 50 and 52. Note is made that aperture 50 is countersunk as seen at 54 to receive a collar 72, said collar having a spherical socket 74 in one end thereof.

The lower gripper assembly further includes an actuating mechanism for moving jaw 38 relative to jaw 40 so as to grip a specimen placed between said jaws. The actuating mechanism comprises: an operating rod 60 having an enlarged head 62 at one end, an elongated slot 64 at the other end and a transversely extending aperture 66; a pair of compression springs 68 and 70; a collar 72 having a spherical socket 74 formed coaxially in one end thereof; an operating cam 80 having a handle 78 rigid therewith and a plurality of adjusting holes 82 formed in spaced relation with each other and offset from the center axis of said cam; and a pin 76.

To assemble the above described parts of the lower gripper assembly as a unit for gripping the lower end of a specimen 10, jaw 40 is positioned in an upright manner (FIGURE 2) on block 30 with key 36 received in keyway 42 in the lower end of the jaw. Setscrew 44 is utilized for locking jaw 40 in a selected position relative to the block. The latter position may be predetermined in accordance with the thickness of the specimen being tested. Normally, this jaw would be set at a distance offset from the center of the key or block equal to one-half the thickness of the specimen being tested. Jaw 38 is then positioned on the block in side-by-side, parallel relation with jaw 40. With key 36 received within keyway 42, block 38 is slidably movable toward and away from jaw 40. To assemble the actuating mechanism, the slotted end of operating rod 60 is sequentially inserted through aperture 52, coiled spring 68, aperture 50, coiled spring 70, and bore 73 in collar 72. Thus, collar 72 is seated in countersunk portion 54 of aperture 50 against the compression of spring 70. Cam 80 is then positioned in slot 64 of rod 60 and is affixed for operation therewith by insertion of pin 76 through aperture 66 and a selected adjusting aperture 82 in the cam. Apertures 50 and 52 are countersunk on the inner, adjacent sides of jaws 38 and 40 to seat opposite ends of spring 68. With the parts assembled as described, it should be apparent that rotation of cam 80 by handle 78 from a position (FIGURE 1) wherein the high side of the cam is engaged in spherical socket 74 to an opposite position wherein the low side of the cam is so engaged, will allow jaw 38 to be moved away from jaw 40. Movement of jaw 38 away from jaw 40 will be caused by inherent expansion of spring 68. Hence, by rotation of the cam ninety degrees clockwise from the closed position (FIGURE 1), the jaws will be in the released position.

To position the holding device for use in holding opposite ends of a specimen, the upper and lower gripper assemblies are affixed, respectively, to the upper and lower relatively movable members of a conventional strain test apparatus (not shown). To secure the upper gripper assembly to member 2 of a test apparatus, shaft 12 is passed with clearance through bore 3 in member 2 and through the axial bore in washer 26. Hence, the lower end of shaft 12 is passed through coil spring 28 and threadedly engaged within the upper end of clevis 16. Likewise, the lower gripper assembly is positioned for use by affixing the same to the opposite, relatively movable member of the test apparatus. Hence, shaft 32 is initially passed with clearance through aligned apertures (not shown) in member 4 and shims or washers 33 and through spring 31. The shaft is then affixed to member 4 by threaded engagement of the upper end thereof within the lower side of block 30.

To secure specimen 10 in the holding device, the specimen is loaded sidewise (FIGURE 1) into the gripper assemblies. Accordingly, the upper end of the specimen is disposed in slot 20 between legs 18 of assembly 6 and secured therewith by insertion of pin 24 through the aligned apertures 22 and 11, respectively, of the legs and sample. To secure the lower end of the specimen in the lower gripper assembly, said assembly is first placed in an open or released position. This position is attained by rotating the cam in a manner so as to position the short side of the cam to be in engagement within the spherical socket of the collar. For example, to position the jaws from the closed or locked position depicted in FIGURE 1 to an open position (not shown), the cam handle must be moved clockwise through an arc of approximately ninety degrees from the position shown. Thus, this movement of the cam allows spring 68 to urge the jaws apart for accommodating the lower end of the specimen between the jaws. The lower end of the specimen is then secured within the lower assembly by insertion of pin 48 through aligned holes in the jaws and specimen.

In operation of the lower gripper assembly to tightly clamp and lock the specimen between the two jaws, the cam is rotated until the high side thereof is in engagement within the socket of the collar to move the movable jaw against the action of the spring into tight engagement with the side of the specimen contiguous thereto.

Thus, with a specimen or sample positioned in the holding device in a manner as described hereinabove, the sample may be tested for tensile strength, elongation, endurance, etc., by relative spreading movement of movable members 2, 4 of a conventional, or the like, tensile test apparatus. It is apparent that while the specimen is being placed under tension, the gripper jaws of the lower assembly provide considerable side support for the end of the specimen clamped therein. It should also be apparent that the thinner the specimen, the more important this side support.

To remove the specimen from the holding device, the cam is rotated to allow the spring between the jaws in the lower assembly to release the clamping effect of the jaws on the lower end of the specimen. For example, in FIGURE 1, the cam lever or handle must be moved through an arc of approximately ninety degrees clockwise to release the jaws. Hence, the holding pins extending through opposite ends of the specimen may be removed so as to allow the upper and lower ends of the specimen to be unloaded in a sidewise manner, i.e., in a plane parallel with the inner faces of the jaws, from the respective gripper assembly.

The lower gripper assembly is adapted to be adjusted to accommodate specimen of different thickness by adjustment of the cam with respect to the actuating rod, and by changing the set position of jaw 40 with respect to movable jaw 38.

Accordingly, a holding device is provided which allows sidewise loading and unloading of a specimen and which provides highly effective side support for the specimen while being tested. Further, a holding device is provided which is adapted for facile assembly with the relatively movable, spreading members of a tensile test machine or apparatus. The device also provides accurate alignment of the specimen secured therein for testing. A further important feature of the holding device according to this invention resides in the provision of resilient mountings for each of the gripper assemblies whereby, when a specimen breaks or ruptures under strain, energy is absorbed thereby.

While the holding device has been described with the upper and lower gripper assemblies, respectively, connected with the upper and lower members of a test machine, it should be apparent that the assemblies may be reversed if desired. Moreover, two gripper assemblies like the lower gripper assembly could be used if side support is required at both ends of the specimen.

It will be apparent that the embodiment shown is only exemplary and that various modifications may be made in construction and arrangement within the scope of the invention as defined in the appended claims.

I claim:
1. A specimen holding device for gripping one end of a relatively thin, flat specimen, said device comprising:
   a mounting head adapted to be fixed to a support and having an integrally formed, T-shaped key extending from one face thereof and in normal relationship therewith;
   a pair of gripper jaws, each jaw having a T-shaped keyway formed in the lower end thereof for matingly receiving said key therein, each of said jaws being further formed intermediate the ends thereof with an aperture extending transversely therethrough, said apertures being in coaxial alignment;
   holding means carried by the upper end of the jaws for affixing said one specimen end thereto;
   locking means carried by one of said jaws for preventing relative movement of said one jaw with respect to said key; and
   an actuating mechanism disposed intermediate opposite ends of said jaws and operable therewith for moving said one jaw toward the other jaw so as to tightly interengage said specimen end therebetween said jaws, said actuating mechanism including an operating rod extending through said aligned apertures and formed on one end with a head and on the other end with an elongated slot extending axially thereof, said rod further having a transversely extending aperture formed through the other end near the terminal portion thereof, a disc-like cam disposed within said slot, said cam having a plurality of holes formed therein, each of said holes being offset and eccentrically arranged with respect to the axis of said cam, and an operating handle operatively connected with said cam for use in rotating the same, said handle being connected with said cam by a pivot pin extending through said transversely extending aperture and through a selected one of said holes in the cam.

2. A specimen holding device according to claim 1, wherein said actuating mechanism further includes a compression spring disposed concentrically about said operating rod in the space between said pair of jaws whereby, upon rotational movement of said cam to the released position, said spring will be permitted to expand so as to automatically urge said jaws apart.

3. A specimen holding device according to claim 1, wherein the support to which the mounting head is affixed is one of the relatively movable members of a conventional test apparatus, said one member having a mounting aperture extending therethrough, and wherein said specimen holding device further includes means for securing said mounting head to said one movable member, said last-named means including a stud extending through the mounting aperture of said member, said stud having an enlarged head on one end thereof and being threadedly engaged with the opposite face of said mounting head, enlarged washer means disposed about said stud adjacent said movable member, and a coiled spring disposed about said stud intermediate said washer and said mounting head.

4. A specimen holding device adapted for use with a conventional test apparatus having first and second relatively movable members, each of said members having a mounting aperture extending therethrough, said device comprising:

a first gripper block having an elongated, U-shaped slot in one end thereof for receiving one end of a material specimen therein and means carried by said block for securing said specimen end therein;

first securement means for securing said first gripper block to said first movable member and including a first stud extending through the mounting aperture in said first member, said stud having an enlarged head on one end thereof and being threadedly engaged at the opposite end thereof with the other end of said first block; a first enlarged washer disposed about said first stud adjacent said first member;

a coiled spring disposed about said first stud intermediate said washer and said first block;

a second gripper block having second means at one en thereof for gripping and supporting the opposite en of the material specimen and including a pair o elongated, plate-like jaws disposed in parallel rela tion on said second block, each of said jaws bein, formed with a transverse aperture, one of said jaw being fixedly secured with respect to said second bloc] and the other of said jaws being adapted for move ment toward and away from said first jaw;

means disposed between said jaws for moving said jaw apart from a gripping to a released position;

actuating means operatively connected with said jaw for moving said second jaw toward said first jaw an( including a force transmitting pin extending througł said last-named transverse apertures, said pin havin a head on one end thereof and an axially extendin slot formed in the other end thereof, an operating handle having a cam disc at one end thereof, said disc being disposed within said axial slot, said disc having a plurality of holes extending transversely therethrough, said holes being arranged eccentrically, and a pivot pin extending through one of said holes for securing said handle to said force transmitting pin;

second securement means for securing said second block to said second movable member and including a second stud extending through the mounting aperture in said second member, said second stud having an enlarged head on one end and being threadedly engaged with said second block at the opposite end thereof;

a second enlarged washer disposed about said second stud; and a second coiled spring disposed about said second stud intermediate said second washer and said second gripper block.

References Cited

UNITED STATES PATENTS 2,350,577  6/1944  Vordahl _____ 73—103 X
2,419,711  4/1947  Dillon _____ 73—103 X

OTHER REFERENCES

Accessory Fixtures for Dillon Model L Tester, W. C. Dillon and Co., Inc., Van Nuys, Calif., p. 16B, October 1959, Class 73—103.

Alignomatic Grips, T.B. 641.01-1, published by Research Inc., Minneapolis, Minn., received Jan. 4, 1965, Class 73—103.

RICHARD C. QUEISSER, Primary Examiner.

JAMES H. WILLIAMSON, Assistant Examiner.